Figure 1:
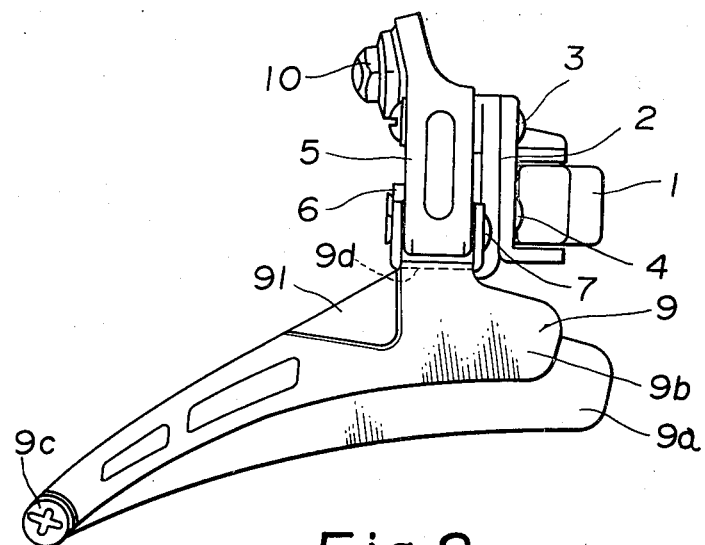

United States Patent [19]

Nagano et al.

[11] 4,223,562
[45] Sep. 23, 1980

[54] FRONT DERAILLEUR FOR A BICYCLE

[75] Inventors: Masashi Nagano, Sakai; Hideaki Fujimoto, Toyonaka; Toshio Mizuno; Tetufumi Egami, both of Sakai, all of Japan

[73] Assignee: Shimano Industrial Company, Limited, Osaka, Japan

[21] Appl. No.: 11,675

[22] Filed: Feb. 12, 1979

[30] Foreign Application Priority Data

Feb. 24, 1978 [JP] Japan .................. 53-23709[U]

[51] Int. Cl.² .............................................. F16H 7/18
[52] U.S. Cl. ...................................................... 474/82
[58] Field of Search .............. 74/217 C, 217 B, 240, 74/611

[56] References Cited

U.S. PATENT DOCUMENTS

| | | | |
|---|---|---|---|
| 2,770,142 | 11/1956 | Margrey | 74/240 |
| 3,184,993 | 5/1965 | Swenson | 74/611 |
| 3,960,025 | 6/1976 | Jay | 74/217 B |
| 4,078,444 | 3/1978 | Huret | 74/240 |

*Primary Examiner*—Leslie Braun
*Assistant Examiner*—Conrad Berman
*Attorney, Agent, or Firm*—Stevens, Davis, Miller & Mosher

[57] ABSTRACT

A front derailleur for a bicycle has a chain guide having two opposite guide plates spaced at an interval larger than the width of a driving chain and an outer guide plate of the two guide plates is provided with a chain face which is formed at a position substantially intermediate lengthwise and at an upper portion widthwise of the same and radially outward to a chain sprocket and projects toward an inner guide plate. The chain guide face and the inner surface of the inner guide plate are spaced at an interval slightly larger than the width of the driving chain and smaller than the interval between the two guide plates.

3 Claims, 10 Drawing Figures

FRONT DERAILLEUR FOR A BICYCLE

This invention relates to a front derailleur for a bicycle, and more particularly, to a front derailleur for switching a driving chain to one of two chain sprockets of different diameters at a crank of the bicycle to thereby change the bicycle speed.

This kind of derailleur generally comprises a fixing member fixed to a seat tube of the bicycle through a tightening band, connecting members, such as two parallel linkage members, and a chain guide. The chain guide comprises two oblong guide plates elongated circumferentially of the chain sprocket and opposite to each other in an axial direction. The driving chain is inserted between the two guide plates and the chain guide is moved with respect to the fixing member to guide the chain with the inner or outer guide plate positioned axially inwardly or outwardly to each of the chain sprockets, thereby switching the chain for changing the bicycle speed.

The chain guide, whose outer and inner guide plates sandwich the chain therebetween and push it toward a sprocket to be engaged for changing the speed, raises the problem that when the guide plates are spaced too narrowly with respect to the width of the chain that are liable to contact the chain generating noise when driving the bicycle, and that those spaced wide enough to eliminate noise, not only lower the speed-change efficiency but also cause the chain to leave the sprocket, resulting in the so-called chain-drop.

A main object of the invention is to provide a front derailleur capable of avoiding noise caused by contact of the chain with the guide plates of the chain guide when driving the bicycle by pedalling, and also provide switching of the chain to a selected one of the sprockets smoothly and quickly for changing the bicycle speed.

In other words, the invention has been designed to solve the aforesaid problem of a lowered speed change efficiency especially when the chain is switched from the smaller diameter low speed sprocket to a larger diameter high speed sprocket.

After various studies regarding the aforesaid conventional defects, the inventor has found that the driving chain, especially when switched from the low speed sprocket to the high speed one, is pushed by the foremost end of inner guide plate axially from the sprocket so as to be disengaged from the low speed sprocket, and then curves to enter slantwise between both the guide plates and tends to engage with the high speed sprocket when switched for the speed change, the chain curves around the foremost end of the inner guide plate in contact with the chain so that the fore end of the curved chain at a side of the rear freewheel, is pushed axially outwardly from the sprocket to thereby tend to contact with a substantially intermediate position lengthwise and upper portion widthwise of the outer guide plate. Hence, a chain guide face is provided at an inner surface of the outer guide plate opposite to the inner guide plate and at a substantially intermediate position lengthwise and upper portion widthwise of the outer guide plate, the portion corresponding to the fore end of the curve of the chain pushed axially outwardly from the sprocket as aforegoing, thereby enabling the chain to be switched smoothly and rapidly especially to the high speed sprocket for changing the speed, thus eliminating the above problems.

The invention is so constructed that two opposite guide plates at the chain guide are spaced at a distance greater than the width of the chain, the outer guide plate of both guide plates is provided at a substantially intermediate position lengthwise and at an upper portion widthwise thereof and radially outwardly from the sprocket with a chain guide face projecting toward the inner guide plate. The chain guide face and the inner surface of the inner guide plate are spaced at a distance slightly greater than the width of the driving chain and more narrowly than the interval between both the outer and inner guide plates.

Accordingly, the front derailleur of the invention provides the chain guide face at the chain guide. Hence, the chain, when switched from the low speed chain sprocket to the high speed one, curves around the foremost end of the inner guide plate and is pushed axially outwardly from the latter sprocket, thereby being guided at the fore end of the curved portion of the chain axially inwardly from the high speed sprocket. As a result, the chain is meshed smoothly and quickly with the high speed sprocket to improve the speed-change efficiency when changing the bicycle speed, and also travels without contacting the chain guide face avoiding noise-making in the bicycle's running.

Figure 2:
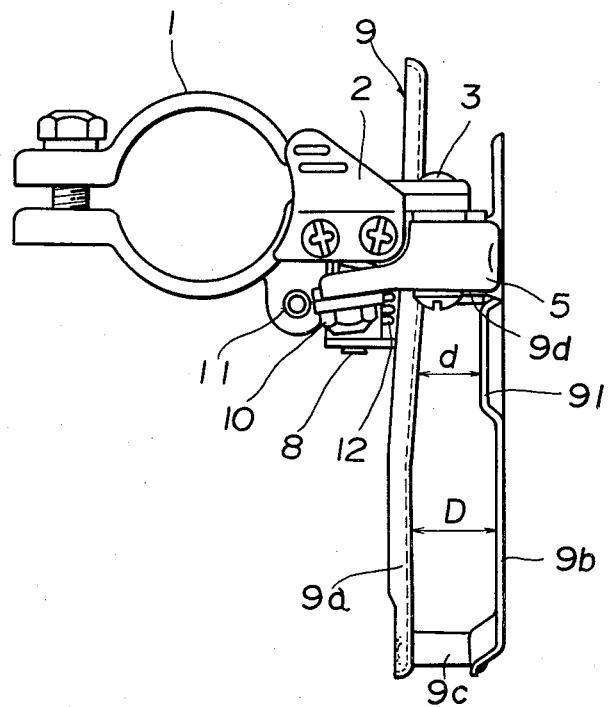
Figure 3:
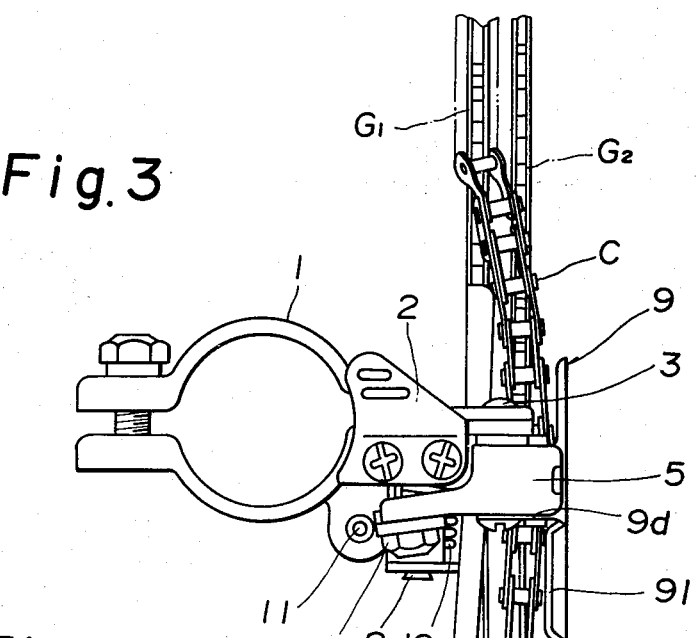
Figure 4:
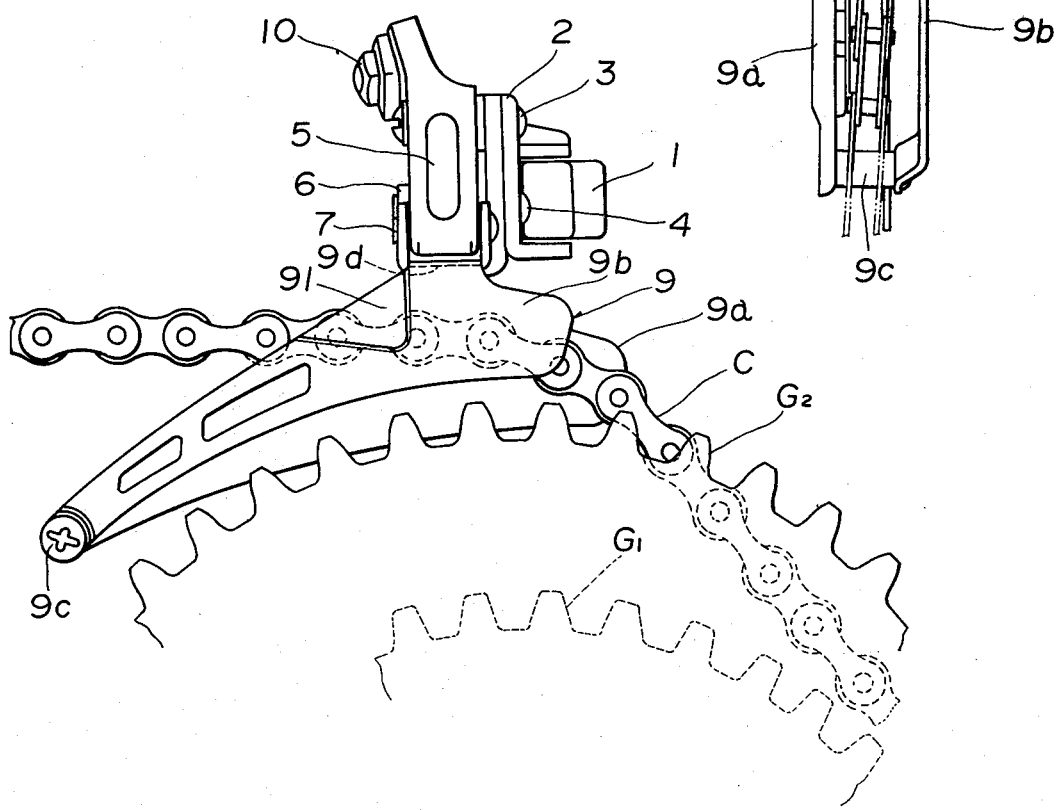
Figure 5:
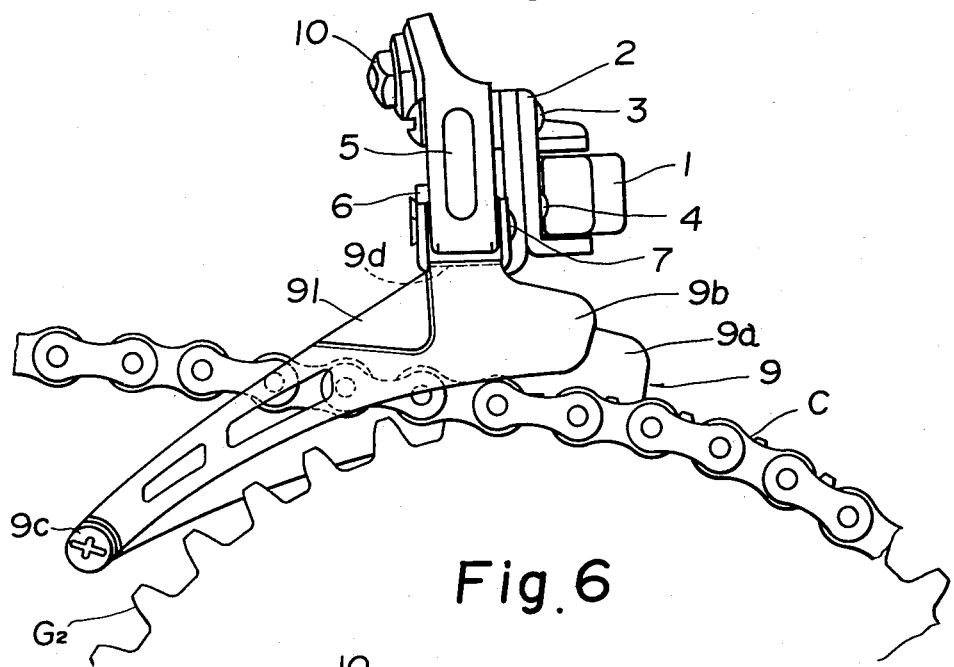
Figure 6:
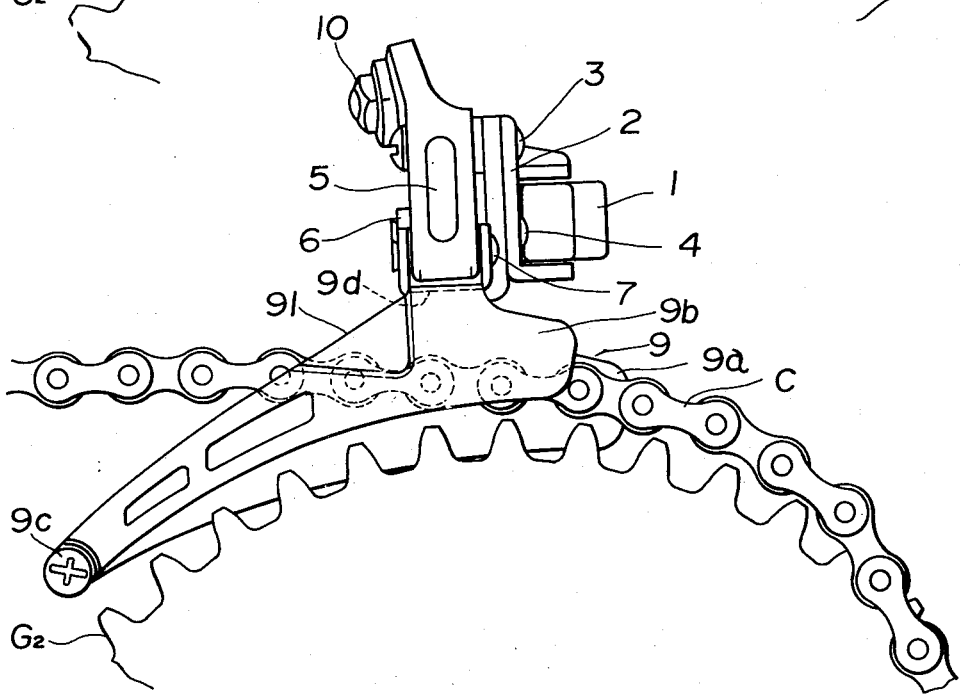
Figure 7:
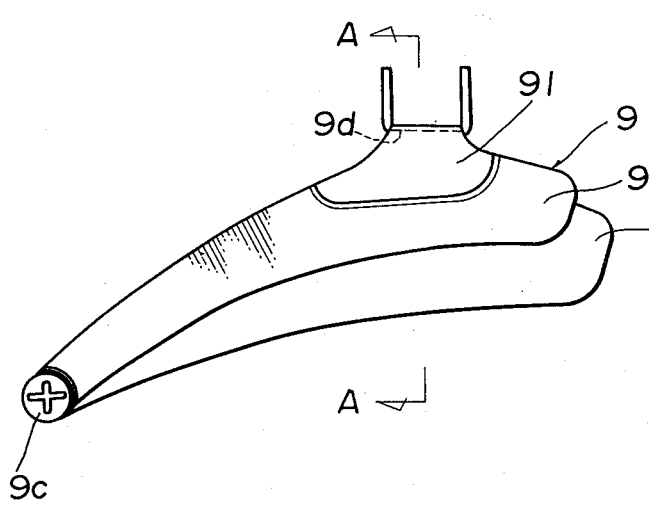
Figure 8:
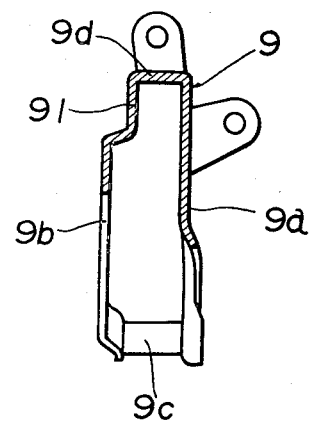
Figure 9:
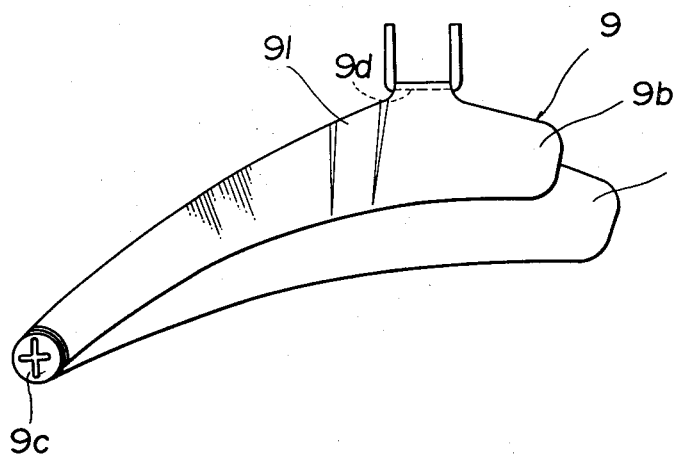
Figure 10:
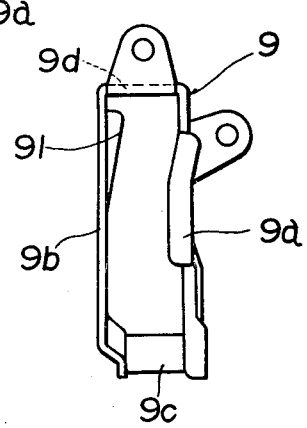

These and other objects of the invention will become more apparent in the detailed description in accordance with the accompanying drawings, in which:

FIG. 1 is a front view of an embodiment of the front derailleur of the invention, FIG. 2 is a plan view thereof, FIGS. 3 through 6 illustrates the function of the front derailleur in FIG. 1, FIG. 3 is a plan view showing the condition of switching a driving chain from a low speed sprocket to a high speed one, FIG. 4 is a front view showing the condition in FIG. 3, FIG. 5 is a front view showing the chain in mesh with the high speed sprocket, FIG. 6 is a front view showing the condition of switching the chain from the high speed sprocket to a low speed one, FIGS. 7 through 10 are partially diagrammatic views of chain guides only of modified embodiments of the invention, in which, FIG. 7 is a front view thereof at one of the modified embodiments, FIG. 8 is a sectional view taken on Line A—A in FIG. 7, FIG. 9 is a front view of the chain guide of the other modified embodiment, and FIG. 10 is a right side view thereof.

In the Figures, reference numeral 1 designates a tightening band fixed to a seat tube (not shown) of the bicycle, and 2 designates a fixing member supported to the tightening band 1. Two parallel linkage members 5 and 6 are pivoted to the fixing member 2 through pins 3 and 4. A chain guide 9 is supported to the foremost ends of the linkage members 5 and 6 through pins 7 and 8 respectively. The linkage members 5 and 6 constitute connecting members of the invention, one of which is provided with a holder 10 for a control wire and the fixing member 2, with a support 11 for an outer sheath guiding the control wire, and a return spring 12 is inserted between the chain guide 9 and the other linkage member 6.

The aforesaid construction of a front derailleur is well-known, in which the chain guide 9 of the invention is constructed as follows:

The chain guide 9 has two guide plates 9a and 9b, of oblong shapes, elongated along the circumference of chain sprockets $G_1$ and $G_2$ as shown in FIG. 4. The two guide plates 9a and 9b are opposite to each other and axial to the sprockets $G_1$ and $G_2$ at an interval D larger than the width of a driving chain C, the interval being kept constant by a pin 9c and connecting plate 9d comprising connecting means.

The chain guide 9 constructed according to the foregoing is shown in FIGS. 1 through 6. The outer guide plate 9b of both the guide plates, which is positioned axially outwardly with respect to each of the sprockets $G_1$ and $G_2$, is provided with a chain guide face 91 which is positioned at a substantially intermediate position lengthwise and widthwise, at the upper portion thereof, and radially outwardly of each of the sprockets $G_1$ and $G_2$, and projects toward the inner surface of the inner guide plate 9a, an interval d between the chain guide face 91 and the inner surface of the inner guide plate 9a is made slightly larger than the width of the driving chain C but smaller than the aforesaid interval D.

The chain guide face 91 in the embodiment shown in FIGS. 1 through 6 is provided longitudinally to the outer guide plate 9b and rearward of the portion mounting the chain guide 9 to the linkage members 5 and 6, and formed in a substantially triangular shape and in parallel throughout to the inner surface of the inner guide plate 9a.

Next, the function of the front derailleur constructed according to the foregoing will be detailed in the following description in accordance with FIGS. 3 through 6. Referring to FIGS. 3 and 4, when the chain C in mesh with the smaller diameter low speed sprocket $G_1$ is switched to the larger diameter high speed one $G_2$ the chain guide 9 is moved rightward in FIG. 3 to contact at the inner guide plate 9a thereof with the chain C and push the chain rightward. Hence, the chain C is partially disengaged from the sprocket $G_1$ for being raised radially outwardly from the high speed sprocket $G_2$ as shown in FIG. 4. Under this condition, the chain C, as shown in FIG. 3 contacts with the foremost end of inner guide plate 9a and curves therearound. In this instance, the fore end of the curved portion of the chain abuts against the chain guide face 91 which is provided at the outer guide plate 9b, whereby the chain partially pushed axially outwardly to the high speed sprocket $G_2$ is guided toward the inner surface of inner guide plate 9a.

Consequently, the chain C, which curves tending to move axially towards of the high speed sprocket $G_2$ as aforegoing, is able to mesh therewith smoothly and rapidly.

In other words, the chain guide 9, whose outer and inner guide plates 9a and 9b are sufficiently spaced to be free from contact with the chain, is able to avoid noise-making, but the chain curved portion around the foremost end of inner guide plate 9a tends to ride over the teeth of high speed sprocket $G_2$ and is pushed radially outward thereof. As a result, the chain C is not smoothly meshed with the sprocket $G_2$ and happens to drop therefrom. The invention, however, provides the chain guide 9 having guide plates spaced fully larger at the interval D, while, the chain guide face 9 receives therewith the fore end of curved chain C to restrain the chain C from moving axially outwardly from the high speed sprocket $G_2$ and guides the chain thereto, thereby eliminating the aforesaid defects, thus switching the chain smoothly and quickly.

After being switched to the high speed sprocket $G_2$ as aforegoing, the chain C steadily engages the high speed sprocket $G_2$ and travels without contacting the chain guide face 91 as shown in FIG. 5, thereby making no noise.

Next, switching the chain C from the high speed sprocket $G_2$ to the low speed one $G_1$, will be detailed in the following description. The chain guide 91 is moved leftward in FIG. 3 to push the chain C leftward through the inner surface of the outer guide plate in contact therewith.

Hence, the chain C is raised radially outwardly to the high speed sprocket $G_2$ and abuts against the chain guide face 91 at the outer guide plate 9b, thereby being moved toward the low speed sprocket $G_1$ ahead of the outer guide plate 9b of chain guide 9 to an extent of the projection of the chain guide face 91 and is switched smoothly and rapidly. In other words, the chain guide face 91 and the inner surface of inner guide plate 9a sandwich therebetween chain C preventing sidewise, movement whereby the chain is properly moved axially of the sprocket, whereby no chain-drop is caused by its short movement.

The aforesaid embodiment has the chain guide face 91 provided at the outer guide plate 9b lengthwise thereof and rearward from the mounting portion of the chain guide 9 to the linkage members 5 and 6. Besides this, the chain guide face 91 may, as shown in FIGS. 7 and 8, be provided at the outer guide plate 9b so as to extend lengthwise thereof from both sides of the mounting portion.

Other than being formed in parallel to the inner surface of the inner guide plate 9a, the chain guide face 91 may, as shown in FIGS. 9 and 10, project slantwise radially outward from the sprockets $G_1$ and $G_2$ toward the inner guide plate 9a. In this instance, the chain C is able to ride on the chain guide face 91 more easily, thereby changing the speed more smoothly.

As clearly understood from the aforesaid description, the derailleur of the invention is so constructed that the chain guide face is provided at the front outer guide plate of the chain guide to be positioned lengthwise at a substantially intermediate portion thereof and radially outward of the chain sprocket, and projects toward the inner surface of the inner guide plate of the chain guide, both the outer and inner guide plates are spaced sufficiently to eliminate noises caused by the contact of the chain with the plates. Simultaneously, the chain guide face can hold the curved portion of chain when switched, whereby the chain may be switched smoothly and quickly to the high bicycle speed sprocket for changing the speed and preventing the so-called chain drop.

Furthermore, when switched from the high speed sprocket to the low speed one, the chain is reliably moved by the chain guide face, thereby smoothly and quickly switched for changing the speed and preventing chain drop without fail.

While the invention has been particularly shown and described with reference to preferred embodiments thereof, it will be understood by those skilled in the art that the foregoing and other changes in form and details can be made therein without departing from the spirit and scope of the invention.

We claim:

1. A front derailleur for a bicycle for switching a driving chain to one of two chain sprockets of different diameters, said derailleur comprising:
   a fixed member fixed to a bicycle frame;
   a connecting member supported movably to said fixing member;
   a chain guide supported to said connecting member and moving together therewith, said chain guide having two elongated oblong guide plates extending along the circumference of said chain sprockets, said two guide plates being opposite to each other and axial to said chain sprockets at an interval larger than the width of said driving chain, said interval being established by connecting means, the outer guide plate of both said guide plates being positioned axially outward to said chain sprocket and having a chain guide face positioned at a substantially intermediate position lengthwise and widthwise radially outward of each of said sprockets, said chain guide face projecting toward said inner guide plate, said chain guide face and inner surface of said inner guide plate having a spacing slightly greater than the width of said driving chain and more narrowly than said interval.

2. A front derailleur for a bicycle according to claim 1, wherein said chain guide face is made parallel to the inner surface of said outer guide plate.

3. A front derailleur for a bicycle according to claim 1, wherein said chain guide face is slanted in such a manner that a portion thereof positioned radially outward from said chain sprocket slantwise projects toward the inner guide plate.

* * * * *